(12) United States Patent
Liu

(10) Patent No.: US 11,334,204 B2
(45) Date of Patent: May 17, 2022

(54) TOUCH COMPONENT, TOUCH APPARATUS, AND TOUCH-CONTROL METHOD

(71) Applicant: SHENZHEN GOODIX TECHNOLOGY CO., LTD., Shenzhen (CN)

(72) Inventor: Shiyu Liu, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 72 days.

(21) Appl. No.: 16/658,158

(22) Filed: Oct. 21, 2019

(65) Prior Publication Data
US 2020/0089373 A1    Mar. 19, 2020

Related U.S. Application Data

(63) Continuation of application No. PCT/CN2018/106294, filed on Sep. 18, 2018.

(51) Int. Cl.
   *G06F 3/044* (2006.01)
   *G06F 3/041* (2006.01)
   *G06F 1/16* (2006.01)

(52) U.S. Cl.
   CPC .......... *G06F 3/0446* (2019.05); *G06F 3/044* (2013.01); *G06F 3/0416* (2013.01);
   (Continued)

(58) Field of Classification Search
   CPC .......... G06F 3/01; G06F 3/041; G06F 3/0416; G06F 3/04164; G06F 3/044;
   (Continued)

(56) References Cited

U.S. PATENT DOCUMENTS

| | | | |
|---|---|---|---|
| 2007/0063987 A1 | 3/2007 | Sato et al. | |
| 2009/0229892 A1* | 9/2009 | Fisher | G06F 1/169 |
| | | | 178/18.03 |

(Continued)

FOREIGN PATENT DOCUMENTS

| | | |
|---|---|---|
| CN | 1936809 A | 3/2007 |
| CN | 104035639 A | 9/2014 |

(Continued)

OTHER PUBLICATIONS

Extended European Search Report for corresponding EP application No. 18914925.5, dated Apr. 9, 2020, 7 pages.

(Continued)

*Primary Examiner* — Jason M Mandeville
(74) *Attorney, Agent, or Firm* — USCH Law, PC

(57) ABSTRACT

The present disclosure relates to touch technologies, and provides a touch component, a touch apparatus using the touch component, and a touch-control method applied to the touch apparatus. The touch component is applied to a wearable device, and includes: M self-capacitive touch electrodes (Cs1 to Csm) disposed on a single pattern wiring layer (10). Each of the touch electrodes (Cs1 to Csm) is connected to a touch chip by a wire on the pattern wiring layer (10). M is a positive integer greater than 2 and less than 10. The M touch electrodes (Cs1 to Csm) form a touch sensing surface of the touch component, the touch sensing surface has at least two sliding detection directions, the at least two sliding detection directions intersect, and a quantity of touch electrodes in each of the sliding detection directions is greater than 1.

12 Claims, 4 Drawing Sheets

(52) U.S. Cl.
CPC .......... *G06F 3/0443* (2019.05); *G06F 3/0448* (2019.05); *G06F 3/04164* (2019.05); *G06F 1/163* (2013.01); *G06F 2203/04107* (2013.01)

(58) Field of Classification Search
CPC .... G06F 3/0443; G06F 3/0446; G06F 3/0448; G06F 3/04847; G06F 3/0488; G06F 3/04886; G06F 2203/04107; G06F 1/163
USPC .................................................. 345/173, 174
See application file for complete search history.

(56) References Cited

U.S. PATENT DOCUMENTS

| | | | | |
|---|---|---|---|---|
| 2010/0058251 | A1* | 3/2010 | Rottler | G06F 3/04845 715/863 |
| 2010/0149127 | A1* | 6/2010 | Fisher | G06F 3/0412 345/174 |
| 2012/0266101 | A1 | 10/2012 | Shah | |
| 2012/0306802 | A1* | 12/2012 | McCracken | G06F 3/04166 345/174 |
| 2013/0339850 | A1 | 12/2013 | Hardi et al. | |
| 2015/0227170 | A1 | 8/2015 | Kim et al. | |
| 2016/0011644 | A1 | 1/2016 | Nishiyama et al. | |
| 2016/0364074 | A1* | 12/2016 | Dorfner | G06F 3/0448 |

FOREIGN PATENT DOCUMENTS

| | | |
|---|---|---|
| CN | 204631838 U | 9/2015 |
| CN | 105094497 A | 11/2015 |
| CN | 105242814 A | 1/2016 |
| CN | 106155430 A | 11/2016 |
| CN | 206236055 U | 6/2017 |
| CN | 107635173 A | 1/2018 |
| CN | 107967085 A | 4/2018 |
| CN | 108388375 A | 8/2018 |
| WO | 2012153899 A1 | 11/2012 |

OTHER PUBLICATIONS

First Office Action and Search Report for corresponding CN application No. 201880001537.6, dated May 18, 2021, 16 pages.

Shenzhen Goodix Technology Co., Ltd., Communication pursuant to Article 94(3) EPC, EP 18914925.5, dated Feb. 15, 2022, 11 pgs.

Greg Tarr, "Review: Hisense 100L8D 4K Short-Throw DLP Laser TV Gets Big Results-HD," Retrieved from the Internet: URL:https://hdguru.com/review-hisense-100I8d-4k-short-throw-dlp-laser-tv-gets-big-results/, Aug. 14, 2018, 17 pgs.

* cited by examiner

TOUCH COMPONENT, TOUCH APPARATUS, AND TOUCH-CONTROL METHOD

CROSS-REFERENCE TO RELATED APPLICATIONS

The present application is a continuation of international application No. PCT/CN2018/106294, filed on Sep. 18, 2018, which is hereby incorporated by reference in its entireties.

TECHNICAL FIELD

The present disclosure relates to touch technologies, and in particular, to a touch component, a touch apparatus using the touch component, and a touch-control method applied to the touch apparatus.

BACKGROUND

A capacitive touch technology has significantly improved human-machine interaction. Currently, conventional large-screen electronic devices such as mobile phones, tablet computers and laptops generally use the capacitive touch technology. With a development of technologies, a market demand for small wearable electronic devices is growing rapidly, and a human-machine interaction technology can be still improved.

The inventor found that at least the following problems exist in existing technologies: a current touch electrode pattern in small wearable electronic devices, which has a relatively small quantity of channels to implement a touch operation, may merely implement a sliding operation in one direction and may not be applied to application scenarios such as sliding up or down, sliding left or right, and sliding around a circle. A touch electrode pattern for conventional touch screens has an excessively large quantity of channels and driver chip pins, a large chip area, a high cost and high power consumption, so the touch electrode pattern for conventional touch screens is not suitable to be directly applied to the wearable device. This problem may be improved by directly reducing the quantity of channels of the touch electrode pattern for conventional touch screens, however, in most cases, two layers of sensor electrodes or sensor electrodes with a bridging structure are needed, which leads to a complex manufacturing process and a relatively high cost, and a method for determining an operation is not optimized specifically for a situation of a relatively small quantity of channels of the touch electrode pattern for conventional touch screens, so that reducing the quantity of channels of the touch electrode pattern for conventional touch screens is not suitable to be directly applied to the wearable device. Therefore, how to flexibly satisfy touch requirements of wearable devices in a more economical way is an urgent problem to be solved for persons skilled in the art.

SUMMARY

An objective of some embodiments of the present disclosure is to provide a touch component, a touch apparatus using the touch component, and a touch-control method applied to the touch apparatus, to provide a touch-control solution with a simple structure, a low cost and a flexible function for a wearable device.

Embodiments of the present disclosure provide a touch component, which is applied to a wearable device. The touch component includes: M self-capacitive touch electrodes disposed on a single pattern wiring layer. Each of the touch electrodes is connected to a touch chip by a wire on the pattern wiring layer. M is a positive integer greater than 2 and less than 10. The M touch electrodes form a touch sensing surface of the touch component. The touch sensing surface has at least two sliding detection directions, the at least two sliding detection directions intersect, and a quantity of touch electrodes in each of the sliding detection directions is greater than 1.

Embodiments of the present disclosure further provide a touch apparatus which includes a touch chip and the above touch component. Each of the touch electrodes of the touch component is electrically connected to the touch chip.

Embodiments of the present disclosure further provide a touch-control method applied to the wearable device. The wearable device includes a touch chip and a touch component. The touch component includes: M self-capacitive touch electrodes disposed on a single pattern wiring layer. Each of the touch electrodes is connected to a touch chip by a wire on the pattern wiring layer. M is a positive integer greater than 2 and less than 10. The M touch electrodes form a touch sensing surface of the touch component. The touch sensing surface has at least two sliding detection directions, the at least two sliding detection directions intersect, and a quantity of touch electrodes in each of the sliding detection directions is greater than 1. The touch-control method includes: acquiring, by the touch component, a plurality of frames of touch data of a touch operation; obtaining touch position information of the touch operation by analyzing the plurality of frames of the touch data, where the touch position information includes at least one touch position, and a position of a touch electrode that has a largest self-capacitance variation value, which is greater than a preset touch threshold value, among the M touch electrodes that correspond to one frame of the touch data, is taken as one touch position of the touch operation; and determining a touch type of the touch operation according to the touch position information of the touch operation and a preset rule, where the touch type includes at least a sliding operation in each of the sliding detection directions.

Compared with existing technologies, the embodiments of the present disclosure may use less than 10 touch electrodes on a single pattern wiring layer to form at least two sliding detection directions. The at least two sliding detection directions intersect, and a quantity of touch electrodes in each of the sliding detection directions is greater than 1. That is, each of the at least two sliding detection directions may detect sliding operations in different directions, thereby facilitating to implement more touch functions. Therefore, the embodiments of the present disclosure may implement more touch functions by a few touch electrodes, and provide a touch-control solution with a simple structure, a low cost and a flexible function for a wearable device.

As one embodiment, M equals 5. One of the touch electrodes is an intermediate electrode located at a center of the touch sensing surface, and the other four touch electrodes are peripheral electrodes located respectively on an upper side, a lower side, a left side and a right side of the intermediate electrode. The intermediate electrode and the peripheral electrodes on the upper side and the lower side of the intermediate electrode form touch electrodes in a vertical sliding direction of the touch sensing surface, and the intermediate electrode and the peripheral electrodes on the left side and the right side of the intermediate electrode form touch electrodes in a horizontal sliding direction of the touch sensing surface.

As one embodiment, four peripheral electrodes have the same shape.

As one embodiment, the intermediate electrode is in a shape of a square, each of the peripheral electrodes is in a shape of a rectangle, and a length of a longer side of the rectangle is equal to a side length of the square. Or the intermediate electrode is in a shape of a circle, each of the peripheral electrodes is in a shape of an isosceles triangle with a vertex angle facing towards the circle, and the vertex angle, of the isosceles triangle, facing towards the circle is cut off by a concentric circle having a diameter greater than that of the circle. Or the intermediate electrode is in a shape of a quadrangle with four inwardly curved arc-edges, and each of the peripheral electrodes is in a shape of an arch with an arc-edge facing towards the intermediate electrode.

As one embodiment, M equals 4, and the touch electrodes are arranged in a matrix of two rows and two columns.

As one embodiment, M equals 3, and the touch sensing surface has a sensing area in a shape of an isosceles triangle, and the touch electrodes are located respectively at vertexes of the isosceles triangle.

As one embodiment, the touch component further includes a shield layer located below the pattern wiring layer.

As one embodiment, the touch component further includes an insulating cover layer covering the pattern wiring layer.

As one embodiment, an arrangement and sizes of the M touch electrodes satisfy the following requirement: when the touch chip uses a single driving mode, the touch electrodes have the same self-capacitance value; or when the touch chip uses an all driving mode, the touch electrodes have the same self-capacitance value.

As one embodiment, determining a touch type of the touch operation according to the touch position information of the touch operation and a preset rule includes: determining the touch type of the touch operation is a long press if a touch position of the touch operation is not changed and a touch duration of the touch operation is longer than a first preset touch duration.

As one embodiment, determining a touch type of the touch operation according to the touch position information of the touch operation and a preset rule includes: determining the touch type of the touch operation is a click if the touch duration of the touch operation is shorter than a second preset touch duration.

As one embodiment, M equals 5. One of the touch electrodes is an intermediate electrode located at a center of the touch sensing surface, and the other four touch electrodes are: a upper electrode located on an upper side of the intermediate electrode; a lower electrode located on a lower side of the intermediate electrode; a left electrode located on a left side of the intermediate electrode; and a right electrode located on a right side of the intermediate electrode. Determining a touch type of the touch operation according to the touch position information of the touch operation and a preset rule includes: determining the touch type of the touch operation is sliding up or down, when the touch position of the touch operation satisfies one of the following preset sliding orders: the touch position moves from the upper electrode to one or two neighboring ones of the left electrode, the intermediate electrode and the right electrode, and to the lower electrode; or the touch position moves from the lower electrode to one or two neighboring ones of the left electrode, the intermediate electrode and the right electrode, and to the upper electrode; or the touch position moves from the upper electrode to the intermediate electrode, and to the left electrode or the right electrode; or the touch position moves from the lower electrode to the intermediate electrode, and to the left electrode or the right electrode.

As one embodiment, M equals 5. One of the touch electrodes is an intermediate electrode located at a center of the touch sensing surface, and the other four touch electrodes are: a upper electrode located on an upper side of the intermediate electrode; a lower electrode located on a lower side of the intermediate electrode; a left electrode located on a left side of the intermediate electrode; and a right electrode located on a right side of the intermediate electrode. Determining a touch type of the touch operation according to the touch position information of the touch operation and a preset rule includes: determining the touch type of the touch operation is sliding left or right, when the touch position of the touch operation satisfies one of the following preset sliding orders: the touch position moves from the left electrode to one or two neighboring ones of the upper electrode, the intermediate electrode and the lower electrode, and to the right electrode; or the touch position moves from the right electrode to one or two neighboring ones of the upper electrode, the intermediate electrode and the lower electrode, and to the left electrode.

As one embodiment, M equals 5. One of the touch electrodes is an intermediate electrode located at a center of the touch sensing surface, and the other four touch electrodes are: a upper electrode located on an upper side of the intermediate electrode; a lower electrode located on a lower side of the intermediate electrode; a left electrode located on a left side of the intermediate electrode; and a right electrode located on a right side of the intermediate electrode. Determining a touch type of the touch operation according to the touch position information of the touch operation and a preset rule includes: determining the touch type of the touch operation is sliding around a circle, when the touch position of the touch operation satisfies the following preset sliding order: the touch position moves from one of the peripheral electrodes around the intermediate electrode to other three peripheral electrodes around the intermediate electrode clockwise or counter-clockwise.

As one embodiment, M equals 4, and the touch electrodes are arranged in a matrix of two rows and two columns. Determining a touch type of the touch operation according to the touch position information of the touch operation and a preset rule includes: determining the touch type of the touch operation is sliding up or down, when the touch position of the touch operation satisfies one of the following preset sliding orders: the touch position moves initially from one of two upper touch electrodes directly to a touch electrode right below the touch electrode at an initial position, or directly to a touch electrode obliquely below the touch electrode at the initial position, or to a touch electrode obliquely below the touch electrode at the initial position through a touch electrode on a left or right side of the touch electrode at the initial position; or the touch position moves initially from one of two lower touch electrodes directly to a touch electrode right above the touch electrode at an initial position, or directly to a touch electrode obliquely above the touch electrode at the initial position, or to a touch electrode obliquely above the touch electrode at the initial position through a touch electrode on a left or right side of the touch electrode at the initial position.

As one embodiment, M equals 4, and the touch electrodes are arranged in a matrix of two rows and two columns. Determining a touch type of the touch operation according to the touch position information of the touch operation and a preset rule includes: determining the touch type of the touch operation is sliding left or right, when the touch position of the touch operation satisfies one of the following preset sliding orders: the touch position moves from a left electrode to a right electrode in any row of touch electrodes; or the touch position moves from a right electrode to a left electrode in any row of touch electrodes.

As one embodiment, M equals 4, and the touch electrodes are arranged in a matrix of two rows and two columns. Determining a touch type of the touch operation according to the touch position information of the touch operation and a preset rule includes: determining the touch type of the touch operation is sliding around a circle, when the touch position of the touch operation satisfies the following preset sliding order: the touch position moves from any one of the touch electrodes to other three touch electrodes clockwise or counter-clockwise.

BRIEF DESCRIPTION OF THE DRAWINGS

One or more embodiments will be illustrated with figures in corresponding accompanying drawings, and these illustrative descriptions do not constitute limitations to the embodiments. Elements with the same reference numerals in the accompanying drawings represent similar elements. The figures in the accompanying drawings are not limited in proportions, unless stated otherwise.

DETAILED DESCRIPTION

To make objectives, technical solutions, and advantages of the present disclosure clearer, the following further describes some embodiments of the present disclosure in detail with reference to accompanying drawings and the embodiments. It should be understood that the specific embodiments described herein are merely used to explain the present disclosure, and are not intended to limit the present disclosure.

It should be noted that directional terms such as "upper", "lower", "left" and "right" in the embodiments of the present disclosure are described according to angles of view illustrated in the accompanying drawings, and should not be understood to limit the embodiments of the present disclosure. In addition, it should be understood that, in the context, when an element was mentioned to be formed on an "upper" side or a "lower" side of another element, the element can be formed directly on the "upper" or "lower" side of the another element, and may also be formed indirectly on the "upper" or "lower" side of the another element through an intermediate element.

Figure 1:
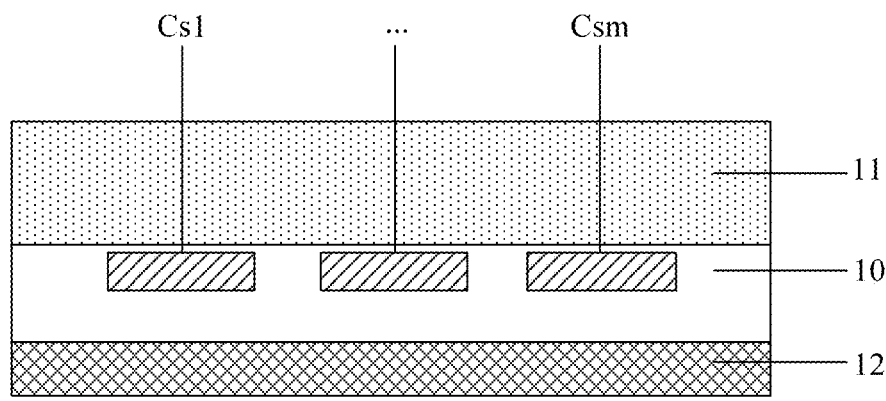
FIG. 1 is a schematic structural diagram of a touch component according to a first embodiment of the present disclosure.

A first embodiment of the present disclosure relates to a touch component applied to a wearable device, which includes, but is not limited to, smart headphones. Referring to FIG. 1, the touch component includes: M self-capacitive touch electrodes (Cs1 to Csm) disposed on a single pattern wiring layer 10. Each of the touch electrodes 101 is connected to a touch chip by a wire on the pattern wiring layer 10. M is a positive integer greater than 2 and less than 10. The quantity M of the touch electrodes in the touch component may be any number of 3 to 9. The M touch electrodes (Cs1 to Csm) form a touch sensing surface of the touch component. The touch sensing surface has at least two sliding detection directions, the at least two sliding detection directions intersect, and a quantity of touch electrodes in each of the sliding detection directions is greater than 1.

For example, two sliding directions that intersect may respectively be a horizontal sliding direction and a vertical sliding direction, that is, the two sliding directions intersect vertically. However, the two sliding directions may not intersect vertically. It is not limited herein. Each of the two sliding directions has more than one touch electrode, therefore, the touch sensing surface can provide sensing ability for two or more touch positions in each sliding direction, and two or more sliding directions, such as sliding up or down, sliding left or right, and the like, may be recognized on the touch sensing surface. Relatively abundant touch functions, such as sliding up or down to switch songs, sliding left or right to adjust volume, and the like, may be provided by recognizing more than two sliding directions, but it is not limited herein. The touch electrodes (Cs1 to Csm) in this embodiment are all self-capacitive touch electrodes with a small quantity of channels and occupied pins of the touch chip, and high touch sensitivity. Therefore, this embodiment may provide a touch-control solution with a simple structure, a low cost and a flexible function for a wearable device, such as headphones and the like, to satisfy touch requirements of small electronic devices.

In an actual application, the touch component may further include an insulating cover layer 11 covering the pattern wiring layer 10. The pattern wiring layer 10 may be pasted to a lower surface of the insulating cover layer 11 by an adhesive (not shown), and an upper surface of the insulating cover layer 11 provides a finger touching surface. In one example, the touch component may further include a shield layer 12 disposed below the pattern wiring layer 10. A ground metal layer may be used as the shield layer 12 to block electromagnetic interference from an external environment. In some examples, a shield layer may not be provided, and it is not limited herein. The touch component in this embodiment may be implemented by the printed circuit board technology. Preferably, the touch component may be made into a flexible printed circuit (FPC) board, or a printed circuit board (PCB). The pattern wiring layer, the insulating cover layer, the shield layer and the like may form each layer of the circuit board.

Figure 2:
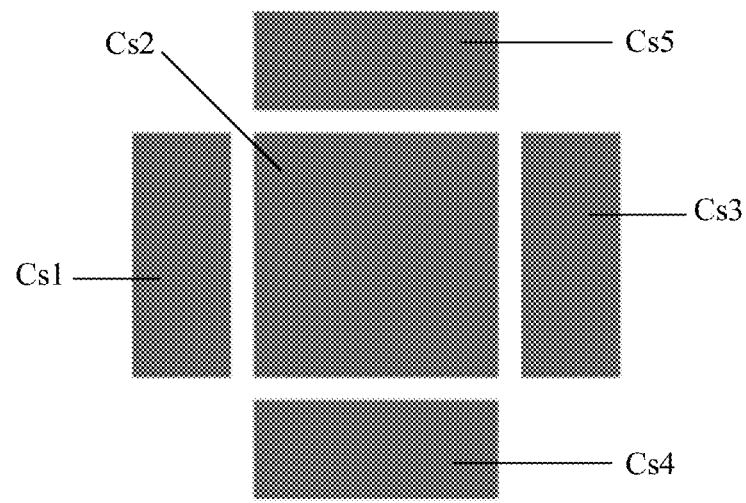
FIG. 2 is a schematic diagram of an arrangement of touch electrodes of a touch component according to the first embodiment of the present disclosure.

Referring to FIG. 2, the touch component in this embodiment has 5 touch electrodes, Cs1 to Cs5 respectively. One of the touch electrodes Cs2 is an intermediate electrode located at a center of the touch sensing surface, and the other four touch electrodes are peripheral electrodes located respectively on an upper side, a lower side, a left side and a right side of the intermediate electrode Cs2, that is, a upper electrode Cs5 located on an upper side of the intermediate electrode Cs2, a lower electrode Cs4 located on a lower side of the intermediate electrode Cs2, a left electrode Cs1 located on a left side of the intermediate electrode Cs2, and a right electrode Cs3 located on a right side of the intermediate electrode Cs2. The intermediate electrode Cs2 and the peripheral electrodes on the upper side and the lower side of the intermediate electrode Cs2 form touch electrodes in a vertical sliding direction of the touch sensing surface, and the intermediate electrode Cs2 and the peripheral electrodes on the left side and the right side of the intermediate electrode Cs2 form touch electrodes in a horizontal sliding direction of the touch sensing surface, so as to detect touch operations in at least two intersecting sliding directions.

In this embodiment, four peripheral electrodes have the same shape so that a structure of the touch component is simpler. However, in an actual application, peripheral electrodes of the intermediate electrode Cs2 may have different shapes. Specifically, with respect to 5 touch electrodes in this embodiment, the intermediate electrode Cs2 is in a square shape, each of the peripheral electrodes is in a rectangle shape, and a length of a longer side of the rectangle is equal to a side length of the square. A specific gap is preset between each two neighboring ones of the touch electrodes, and the intermediate electrode may be connected to a touch chip by a wire in the gap. It should be understood that a size of each of the touch electrodes Cs1 to Cs5 and a distance between each two neighboring ones of the touch electrodes Cs1 to Cs5 may be adjusted according to application requirements and actual situations.

In an actual application, each touch electrode is connected to a pin of the touch chip by a wire directly formed on the electrode pattern layer, so that a self-capacitance value of each of the touch electrodes Cs1 to Cs5 may be detected by the touch chip. When a finger touches an upper surface of the insulating cover layer 2, a self-capacitance value of a corresponding touch electrode is increased, and a touch position is determined by detecting a position of the touch electrode with the increased self-capacitance value. Specifically, touch information may be detected by using a single driving mode, that is, other touch electrodes may be connected to ground when a self-capacitance value of a particular touch electrode is detected. Alternatively, an all driving mode may be used, that is, other touch electrodes and a current touch electrode are connected to the same variation signal. In this way, mutual capacitance between the current touch electrode and each of the other electrodes may be eliminated, and an increment of the self-capacitance value caused by the finger may be increased.

Based on this embodiment, the touch component having 5 touch electrodes may implement touch operations, such as a click, a long press, sliding up or down, sliding left or right, sliding around a circle. The following are specific determining manners for a touch type of the touch operation.

At step S1, a touch threshold value is preset, that is, a self-capacitance variation threshold value of a touch electrode is preset. The touch electrode is determined to be touched by a finger if an actual self-capacitance variation value of the touch electrode is greater than the preset touch threshold value; or the touch electrode is determined not to be touched by a finger if an actual self-capacitance variation value is less than or equal to the preset touch threshold value.

At step S2, a touch electrode having a largest self-capacitance variation value among touch electrodes that are touched by the finger is determined to be an "action electrode". The action electrode may be a touch electrode, or a plurality of touch electrodes.

At step S3, whether the action electrode changes is determined (that is, whether a touch position changes is determined). If the action electrode has been determined to be in a "touched" state and the touch position of the action electrode has not changed at a few time points subsequently, a current touch operation is determined to be a long press operation. In other words, if a touch position of the touch operation has not changed and a touch duration of the touch operation is longer than a first preset touch duration, a touch type of the touch operation is determined to be a long press. The touch operation may have one or more touch durations. One touch duration is a duration between a time point of a first action electrode and that of a last action electrode, and different action electrodes corresponds to different sampling time points respectively. If a state of the action electrode is switched between a "touched" state and an "untouched" state while the position of the action electrode remains unchanged, the touch type of the touch operation is determined to be a click operation. A single click, a double click, a triple click or the like may further be determined according to click times. If the position of the action electrode changes, and a time interval exists during the change, that is, an "untouched" state exists at a few sampling time points during the change, the touch type of the touch operation is determined to be a click operation. A double click, a triple click or the like may also be determined according to the click times. In other words, if the touch duration of the touch operation is shorter than a second preset touch duration, the touch type of the touch operation is determined to be a click. A touch operation may include a plurality of touch durations. When there is only one touch duration, it may be determined to be a click. When there are a plurality of touch durations, each of the touch duration is shorter than a second preset touch duration, and an interval between each two neighboring ones of the touch durations is relatively small, the touch type of the touch operation may be determined to be multiple clicks. A double click, a triple click or the like may be determined according to the click times. The first preset touch duration and the second preset touch duration may be set according to actual requirements, and this embodiment does not limit values of the first preset touch duration and the second preset touch duration.

At step S4, a sliding direction is determined according to a change order of the position of the action electrode if the position of the action electrode changes.

Specifically, the touch type of the touch operation is determined to be sliding up or down when the change of the position of the action electrode (that is, the touch position of the touch operation) satisfies one of the following preset sliding orders: the touch position (that is, the position of the action electrode) moves from the upper electrode Cs5 to one or two neighboring ones of the left electrode Cs1, the intermediate electrode Cs2 and the right electrode Cs3, and to the lower electrode Cs4; or the touch position moves from the lower electrode Cs4 to one or two neighboring ones of the left electrode Cs1, the intermediate electrode Cs2 and the right electrode Cs3, and to the upper electrode Cs5; or the touch position moves from the upper electrode Cs5 to the intermediate electrode Cs2, and to the left electrode Cs1 or the right electrode Cs3; or the touch position moves from the lower Cs4 to the intermediate electrode Cs2, and to the left electrode Cs1 or the right electrode Cs3.

The upper electrode Cs5 is used as an example of an initial action electrode, and a situation in which the lower electrode Cs4 is used as the initial position may be deduced by analogy. The touch type of the touch operation is determined to be sliding up or down if the change of the position of the action electrode satisfies one of sliding orders (a), (b) and (c):

(a) Cs5-Cs2-Cs4, or Cs5-Cs1-Cs4, or Cs5-Cs3-Cs4;
(b) Cs5-Cs1-Cs2-Cs4, or Cs5-Cs2-Cs1-Cs4, or Cs5-Cs2-Cs3-Cs4, or Cs5-Cs3-Cs2-Cs4; and
(c) Cs5-Cs2-Cs1, or Cs5-Cs2-Cs3.

The touch type of the touch operation is determined to be sliding left or right when the change of the position of the action electrode satisfies one of the following preset sliding orders: the touch position moves from the left electrode Cs1 to one or two neighboring ones of the upper electrode Cs5, the intermediate electrode Cs2 and the lower electrode Cs4, and to the right electrode Cs3; or the touch position moves from the right electrode Cs3 to one or two neighboring ones of the upper electrode Cs5, the intermediate electrode Cs2 and the lower electrode Cs4, and to the left electrode Cs1.

The left electrode Cs1 is used as an example of an initial action electrode, and a situation in which the right electrode Cs3 is used as the initial position may be deduced by analogy. The touch type of the touch operation is determined to be sliding left or right if the change of the position of the action electrode satisfies one of sliding orders (d) and (e):
(d) Cs1-Cs2-Cs3, or Cs1-Cs5-Cs3, or Cs1-Cs4-Cs3; and
(e) Cs1-Cs5-Cs2-Cs3, or Cs1-Cs2-Cs5-Cs3, or Cs1-Cs2-Cs4-Cs3, or Cs1-Cs4-Cs2-Cs3.

It should be noted that, in a situation in which the change order of the touch position is Cs5-Cs1, Cs5-Cs2, Cs5-Cs3, or the like, no sliding may be determined because the touch position before the change and the touch position after the change are close to each other, thereby reducing false triggers.

The touch type of the touch operation is determined to be sliding around a circle when the change of the position of the action electrode satisfies the following preset sliding order: the touch position moves from one of the peripheral electrodes around the intermediate electrode Cs2 to other three peripheral electrodes around the intermediate electrode Cs2 clockwise or counter-clockwise.

The upper electrode Cs5 is used as an example of an initial action electrode, and a situation in which one of the peripheral electrodes is used as the initial position may be deduced by analogy. The touch type of the touch operation is determined to be sliding around a circle if the change of the position of the action electrode satisfies a sliding orders (e):
(e) Cs5-Cs3-Cs4-Cs1, or Cs5-Cs1-Cs4-Cs3.

It should be understood that sizes of the touch electrodes and distances between two neighboring ones of the touch electrodes may be adjusted according to an actual situation, and a touch threshold value for a finger touch, a time interval for the change of the action electrode and determining an order for the sliding direction may also be adjusted according to an application requirement or an actual situation.

Compared to existing technologies, this embodiment may implement, by using 5 touch electrodes, a plurality of touch functions such as sliding up or down, sliding left or right, sliding around a circle, or the like. Due to a small quantity of the touch electrodes needed, a small quantity of the touch channels are needed by the touch electrodes and the touch chip have a quite small quantity of pins, a small area and low power consumption, thereby proving a touch solution extremely applicable for small portable or wearable devices.

A second embodiment of the present disclosure relates to a touch component. A quantity, an arrangement and an operating principle of touch electrodes of the touch component, a connection manner between each of the touch electrodes and a touch chip, and a method for recognizing a touch type of a touch operation based on the touch electrodes in the second embodiment are the same as those in the first embodiment, and details are not described herein again. A difference therebetween is shapes of the touch electrodes.

Figure 3:
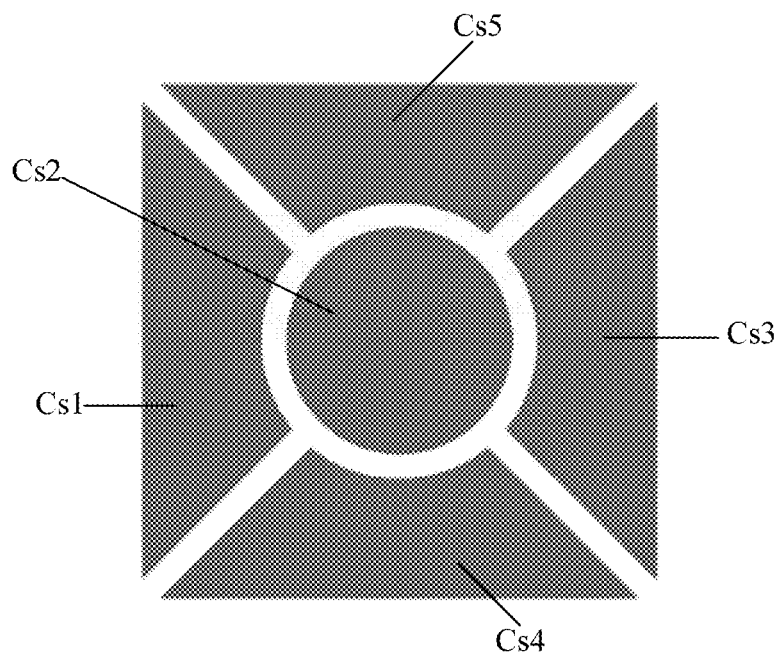
FIG. 3 is a schematic diagram of an arrangement of touch electrodes of a touch component according to a second embodiment of the present disclosure.

Referring to FIG. 3, with respect to 5 touch electrodes of the touch component in this embodiment, an intermediate electrode Cs2 is in a shape of a circle, each of the peripheral electrode is in a shape of an isosceles triangle with a vertex angle facing towards the circle, and the vertex angle, of the isosceles triangle, facing towards the circle is cut off by a concentric circle having a diameter greater than that of the circle. In other words, the 5 touch electrodes in this embodiment can be obtained as follows: an electrode pattern having a shape of a square is formed, a ring-shaped groove sharing the same center with the square is formed on the electrode pattern having the shape of the square, where a circle electrode pattern in an inner side of the ring-shaped groove is an intermediate electrode, and rectangle grooves with the same width are formed at an outer side of the ring-shaped groove and along the diagonal lines of the electrode pattern having the shape of the square so that 4 peripheral electrodes having the same shape and size are obtained.

When the touch electrodes are not touched by a finger, a self-capacitance value (also referred to as a base capacitance value) of each of the touch electrodes (Cs1 to Csm) of the touch component is influenced by an arrangement manner and a size of the touch electrodes, and a driving manner of a touch chip.

As shown in FIG. 3, a single driving mode is applicable for the touch component in this embodiment. That is, sizes of the intermediate electrode Cs2 and each of the peripheral electrodes are adjusted when each of the peripheral electrodes is arranged symmetrically around the intermediate electrode Cs2, for example, the size of the intermediate electrode Cs2 is made slightly smaller than the size of each of the peripheral electrodes. In this way, each of the peripheral electrodes has the same self-capacitance value when the touch chip uses a single driving mode, thereby bringing convenience for designing a circuit of the touch chip. In one example, the touch component shown in FIG. 3 may also be designed so that an all driving mode is applicable for the touch component. That is, the size of the intermediate electrode Cs2 is made slightly bigger than the size of each of the peripheral electrodes so that each of the touch electrodes has the same self-capacitance value when the touch chip uses the all driving mode. However, it is not limited thereto herein. In this embodiment, a size of each of the touch electrodes and a distance between each two neighboring ones of the touch electrodes may be adjusted according to an application requirement and an actual situation.

Compared with the first embodiment, this embodiment may make, by adjusting the size of each of the touch electrodes, each of the touch electrodes have the same self-capacitance value when the touch chip uses the single driving mode, thereby reducing difficulty for designing the touch chip.

A third embodiment of the present disclosure relates to a touch component. A quantity, an arrangement and an operating principle of touch electrodes of the touch component, a connection manner between each of the touch electrodes and a touch chip, and a method for recognizing a touch type of a touch operation based on the touch electrodes in the third embodiment are the same as those in the first embodiment, and details are not described herein again. A difference therebetween is shapes of the touch electrodes.

Figure 4:
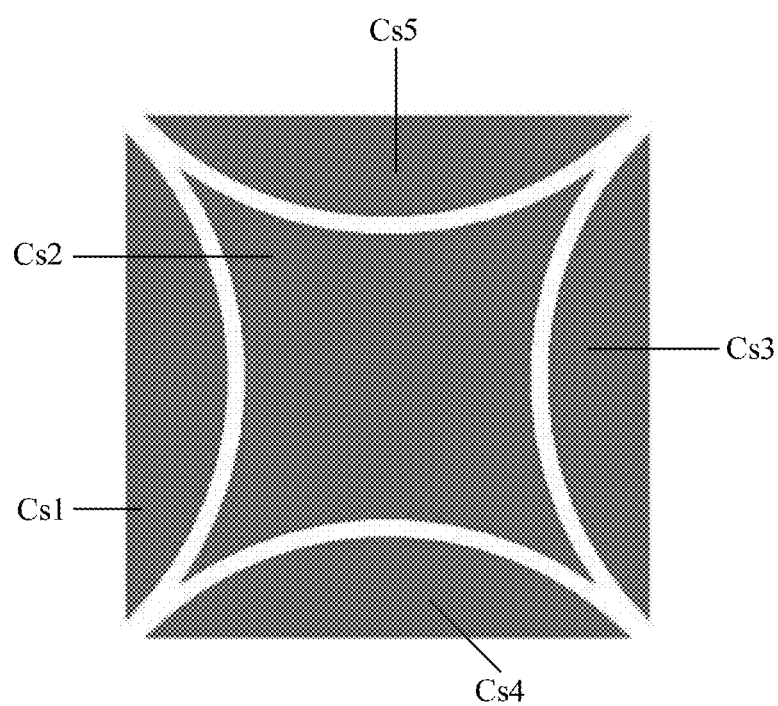
FIG. 4 is a schematic diagram of an arrangement of touch electrodes of a touch component according to a third embodiment of the present disclosure.

Referring to FIG. 4, with respect to 5 touch electrodes of the touch component in this embodiment, the intermediate electrode Cs2 is in a shape of a quadrangle with four inwardly curved arc-edges, and each of the peripheral electrodes is in a shape of an arch with an arc-edge facing towards the intermediate electrode Cs2. The intermediate electrode Cs2 may be obtained by cutting off peripheral portions of a square by using four circles. In this embodiment, when the touch chip uses an all driving mode, a size of each of the touch electrodes is adjusted, for example, the size of the intermediate electrode Cs2 is made slightly bigger than the size of each of the peripheral electrodes, so that each of the touch electrodes may have the same self-capacitance value when there is no finger touch, thereby bringing convenience for designing a circuit of the touch chip. In one example, the touch component shown in FIG. 4 may also be designed so that a single driving mode is applicable for the touch component. That is, when the touch chip uses the single driving mode, the size of the intermediate electrode Cs2 is made slightly smaller than the size of each of the peripheral electrodes, so that each of the touch electrodes has the same self-capacitance value. However, it is not limited thereto herein. In this embodiment, a size of each of the touch electrodes and a distance between each two neighboring ones of the touch electrodes may be adjusted according to an application requirement and an actual situation.

Compared with the first embodiment, this embodiment may make, by adjusting the size of each of the touch electrodes, each of the touch electrodes have the same self-capacitance value when the touch chip uses the all driving mode, thereby reducing difficulty designing for the touch chip.

A fourth embodiment of the present disclosure relates to a touch component. An operating principle of touch electrodes and a connection manner between each of the touch electrodes and a touch chip are the same as those in the above embodiments, and details are not described herein again. A main difference between this embodiment and each of the above embodiments is that a quantity of the touch electrodes is four, and touch functions, such as sliding up or down, sliding left or right, sliding around a circle, and the like, are implemented based on the four touch electrodes.

Figure 5:
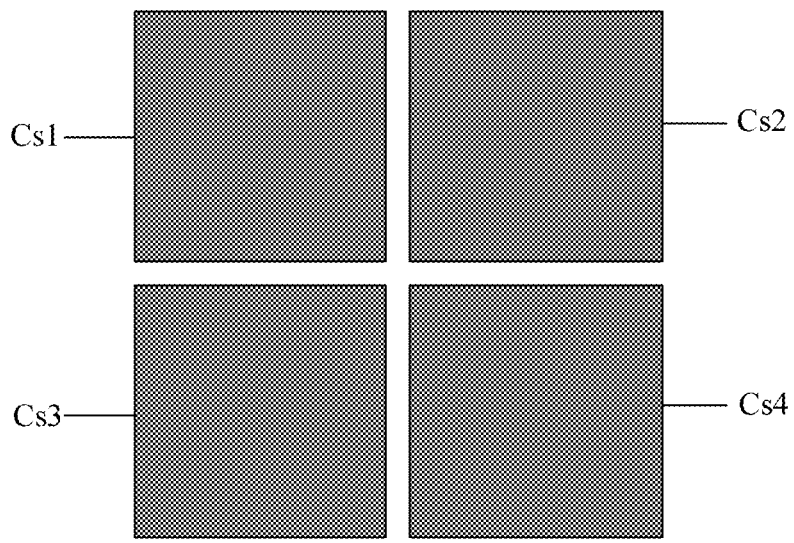
FIG. 5 is a schematic diagram of an arrangement of touch electrodes of a touch component according to a fourth embodiment of the present disclosure.

Referring to FIG. 5, the 4 touch electrodes in this embodiment are arranged in a matrix of two rows and two columns. The 4 touch electrodes are respectively Cs1 at a first row and a first column, Cs2 at the first row and a second column, Cs3 at a second row and the first column, and Cs4 at the second row and the second column.

In this embodiment, each of the touch electrodes is in a shape of a square, but it is not limited thereto herein. Each of the touch electrodes may alternatively use a shape of a rectangle, a circle, a rhombus, a star or the like.

The touch component in this embodiment may implement operations such as a click, a long press, sliding up or down, sliding left or right, sliding around a circle and the like. Determining manners for touch types, such as a click and a long press, are similar to those of 5 touch electrodes, and details are not described herein again. Determining manners for determining touch types, such as sliding up or down, sliding left or right and sliding around a circle, are as follows.

The touch type of the touch operation is determined to be sliding up or down, when a change of a position of an action electrode satisfies one of the following preset sliding orders:

the touch position moves initially from one of two upper touch electrodes directly to a touch electrode right below the touch electrode at an initial position, or directly to a touch electrode obliquely below the touch electrode at the initial position, or to a touch electrode obliquely below the touch electrode at the initial position through a touch electrode on a left or right side of the touch electrode at the initial position; or the touch position moves initially from one of two lower touch electrodes directly to a touch electrode right above the touch electrode at the initial position, or directly to a touch electrode obliquely above the touch electrode at the initial position, or to a touch electrode obliquely above the touch electrode at the initial position through a touch electrode on a left or right side of the touch electrode at the initial position.

Cs1 and Cs2 is used as an example of initial action electrode, and a situation in which one of the other electrodes is used as the initial position may be deduced by analogy. The touch type of the touch operation is determined to be sliding up or down if the change of the position of the action electrode satisfies one of the following sliding orders:

Cs1-Cs3, or Cs2-Cs4, or Cs1-Cs4, or Cs1-Cs2-Cs4, or Cs1-Cs3-Cs4.

The touch type of the touch operation is determined to be sliding left or right when the change of the position of the action electrode satisfies one of the following preset sliding orders:

the touch position moves from a left electrode to a right electrode; or the touch position moves from a right electrode to a left electrode. Herein, the left electrode and the right electrode are in any row of touch electrodes.

Cs1 and Cs3 is used as an example of initial action electrodes, and a situation in which one of the other electrodes is used as the initial position may be deduced by analogy. The touch type of the touch operation is determined to be sliding left or right if the change of the position of the action electrode satisfies the following sliding orders: Cs1-Cs2, or Cs3-Cs4.

The touch type of the touch operation is determined to be sliding around a circle when the change of the position of the action electrode satisfies the following preset sliding order: the touch position moves from any one of the touch electrodes to the other three touch electrodes clockwise or counter-clockwise.

Cs1 is used as an example of the initial action electrode, and a situation in which one of the other electrodes is used as the initial position may be deduced by analogy. The touch type of the touch operation is determined to be sliding around a circle if the change of the position of the action electrode satisfies the following sliding orders: Cs1-Cs2-Cs4-Cs3, or Cs1-Cs3-Cs4-Cs2.

In particular, the touch type of the touch operation is determined to be a click operation if the action electrode switches between two positions and the initial touch position is the final touch position. Cs1 is used as an example of the initial action electrode, and a situation in which one of the other electrodes is used as the initial position may be deduced by analogy. The touch type of the touch operation is determined to be a click operation if the change of the position of the action electrode satisfies one of the following orders: Cs1-Cs2-Cs1, or Cs1-Cs3-Cs1, or Cs1-Cs4-Cs1. In this way, false triggers are avoided when a touch sensing surface is relatively small.

The touch component in this embodiment only need 4 channels to implement touch operations such as a click (including a single click, a double click, a triple click and the like), a long press, sliding up or down, sliding left or right, sliding around a circle and the like, and the touch chip needed has a small quantity of pins, a small area, low power consumption and a low cost. Therefore, the touch component has tremendous application value in wearable devices, and is suitable to be popularized widely.

A fifth embodiment of the present disclosure relates to a touch component. An operating principle of touch electrodes and an connection manner between each of the touch electrodes and a touch chip are the same as those in the above embodiments, and details are not described herein again. A main difference between this embodiment and each of the above embodiments is that a quantity of the touch electrodes is 3, and touch functions, such as a click, a long press, sliding up or down, sliding left or right, sliding around a circle, and the like, are implemented based on the 3 touch electrodes.

Figure 6:
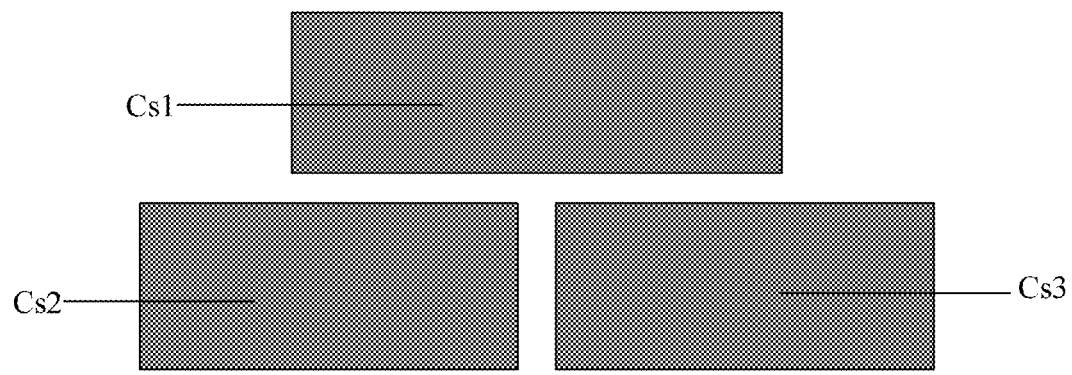
FIG. 6 is a schematic diagram of an arrangement of touch electrodes of a touch component according to a fifth embodiment of the present disclosure.

Referring to FIG. 6, the touch component in this embodiment includes 3 touch electrodes Cs1 to Cs3. A touch sensing surface form by Cs1 to Cs3 has a sensing area in a shape of an isosceles triangle, and the touch electrodes are located respectively at vertexes of the isosceles triangle. In this embodiment, Cs1 and Cs2 are touch electrodes in a first sliding detection direction, and Cs1 and Cs3 are touch electrodes in a second sliding detection direction. The first sliding detection direction and the second sliding detection direction intersect in a vertical way or not in a vertical way.

The touch type of the touch operation is determined to be sliding in the first sliding direction when a position of an action electrode changes in an order of Cs1-Cs2. The touch type of the touch operation is determined to be sliding in the second sliding direction when the position of the action electrode changes in an order of Cs1-Cs3. The touch type of the touch operation is determined to be sliding around a circle when the position of the action electrode changes in an order, for example, Cs1-Cs2-Cs3. Determining manners for a click or a long press are similar to those in the above embodiments, and details are not described herein again.

In this embodiment, only 3 channels are needed to implement touch operations such as a click (including a single click, a double click, a triple click and the like), a long press, sliding up or down, sliding left or right, sliding around a circle and the like. Therefore, the touch component has tremendous application value.

It should be noted that, in some examples, a quantity of touch electrodes of the touch component may alternatively be 6, 7, 8 or 9. When the quantity of touch electrodes is 9, the 9 touch electrodes may be arranged into three rows and three columns, but it is not limited thereto herein as long as touch operations in more sliding directions can be detected.

A sixth embodiment of the present disclosure relates to a touch apparatus including a touch chip and the touch component according to any one of the above embodiments. Each of touch electrodes of the touch component is electrically connected to the touch chip respectively. A specific structure of the touch component can refer to the above embodiments, and details are not described herein again.

With respect to the touch apparatus in this embodiment, touch operations, such as a click (including a single click, a double click, a triple click and the like), a long press, sliding up or down, sliding left or right, sliding around a circle and the like, are implemented based on quite a few channels, for example, 4 or 5, and the touch chip needed has a small quantity of pins, a small area, low power consumption and a low cost. Therefore, the touch apparatus has tremendous application value in wearable devices, and is suitable to be popularized widely.

A seventh embodiment of the present disclosure relates to a touch-control method, which is applied to a wearable device such as headphones. The wearable device includes a touch apparatus according to any one of the above embodiments. A specific structure of the touch component can refer to the above embodiments, and details are not described herein again.

Figure 7:
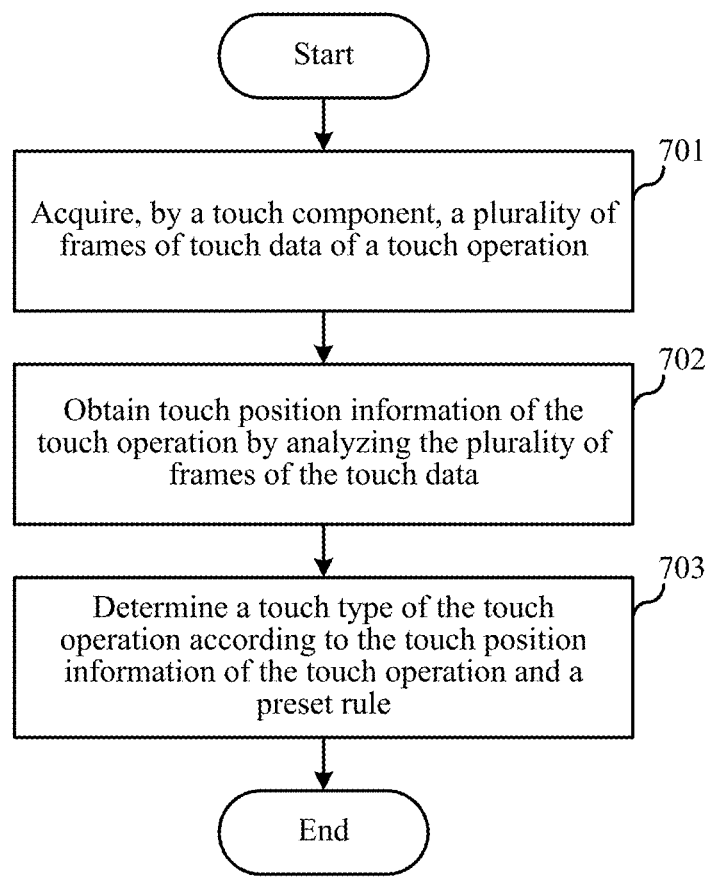
FIG. 7 is a flowchart of a touch-control method according to a seventh embodiment of the present disclosure.

Referring to FIG. 7, the touch-control method in this embodiment includes steps 701 to 703.

At step 701, a plurality of frames of touch data of a touch operation is acquired by a touch component.

At step 702, touch position information of the touch operation is obtained by analyzing the plurality of frames of touch data.

The touch position information includes at least one touch position, and a position of a touch electrode that has a largest self-capacitance variation value, which is greater than a preset touch threshold value, among the M touch electrodes that correspond to one frame of the touch data, is taken as one touch position of the touch operation.

At step 703, a touch type of the touch operation is determined according to the touch position information of the touch operation and a preset rule.

The touch type may include: a click (including a single click, a double click, a triple click and the like), a long press, sliding up or down, sliding left or right, sliding around a circle and the like. The touch type includes the touch operations in at least two sliding detection directions.

For example, when a quantity of the touch electrodes is merely 5, a method for recognizing the touch type in the first embodiment may be used, and details are not described herein again. When the quantity of the touch electrodes is merely 4, a method for recognizing the touch type in the fourth embodiment may be used, and details are not described herein again.

With respect to the touch-control method in this embodiment, touch operations, such as a click (including a single click, a double click, a triple click and the like), a long press, sliding up or down, sliding left or right, sliding around a circle and the like, are implemented based on 4 or 5 channels, and the touch chip needed has a small quantity of pins, a small area, low power consumption and a low cost. Therefore, the touch apparatus has tremendous application value in wearable devices, and is suitable to be popularized widely.

A person of ordinary skill in the art may understand that the above embodiments are specific examples to implement the present disclosure, and variations can be made in forms and details thereto in actual application without departing from the spirit and scope of the present disclosure.

What is claimed is:

1. A touch component, applied to a wearable device, wherein the touch component comprises M self-capacitive touch electrodes disposed on a single pattern wiring layer, each of the touch electrodes is connected to a touch chip by a wire on the pattern wiring layer, and M is a positive integer greater than 2 and less than 10;

wherein the M touch electrodes form a touch sensing surface of the touch component, the touch sensing surface has a plurality of sliding detection directions, at least two of the plurality of sliding detection directions intersect and each associated with a respective touch function, a quantity of touch electrodes in each of the sliding detection directions is greater than 1, and the touch electrodes are arranged in an electrode pattern having a shape of a square;

wherein M equals 5, one of the touch electrodes is an intermediate electrode located at a center of the touch sensing surface, and other four of the touch electrodes are four peripheral electrodes located respectively on an upper side, a lower side, a left side and a right side of the intermediate electrode; the intermediate electrode and two of the four peripheral electrodes on the upper side and the lower side of the intermediate electrode form touch electrodes in a vertical sliding direction of the touch sensing surface, the intermediate electrode and two of the four peripheral electrodes on the left side and the right side of the intermediate electrode form touch electrodes in a horizontal sliding direction of the touch sensing surface; and wherein the four peripheral electrodes have the same shape, the intermediate electrode is in a shape of a quadrangle with four inwardly curved arc-edges, and each of the four peripheral electrodes is in a shape of an arch with an arc-edge facing towards the intermediate electrode.

2. The touch component according to claim 1, wherein the touch component further comprises a shield layer located below the pattern wiring layer.

3. The touch component according to claim 1, wherein the touch component further comprises an insulating cover layer covering the pattern wiring layer.

4. The touch component according to claim 1, wherein an arrangement and sizes of the M touch electrodes satisfy the following requirement:

when the touch chip uses a single driving mode, the touch electrodes have the same self-capacitance value; or when the touch chip uses an all driving mode, the touch electrodes have the same self-capacitance value.

5. The touch component according to claim 1, wherein the size of the intermediate electrode is smaller than the size of each of the peripheral electrodes in such a way that the touch electrodes have the same self-capacitance value in a single driving mode of the touch chip; or the size of the intermediate electrode is bigger than the size of each of the peripheral electrodes in such a way that the touch electrodes have the same self-capacitance value in an all driving mode of the touch chip.

6. A touch apparatus, comprising a touch chip and a touch component applied to a wearable device, wherein the touch component comprises M self-capacitive touch electrodes disposed on a single pattern wiring layer, each of the touch electrodes is connected to a touch chip by a wire on the pattern wiring layer, and M is a positive integer greater than 2 and less than 10; and wherein the M touch electrodes form a touch sensing surface of the touch component, the touch sensing surface has a plurality of sliding detection directions, at least two of the plurality of sliding detection directions intersect and each associated with a respective touch function, a quantity of touch electrodes in each of the sliding detection directions is greater than 1, and the touch electrodes are arranged in an electrode pattern having a shape of a square;

wherein M equals 5, one of the touch electrodes is an intermediate electrode located at a center of the touch sensing surface, and other four of the touch electrodes are four peripheral electrodes located respectively on an upper side, a lower side, a left side and a right side of the intermediate electrode; the intermediate electrode and two of the four peripheral electrodes on the upper side and the lower side of the intermediate electrode form touch electrodes in a vertical sliding direction of the touch sensing surface, the intermediate electrode and two of the four peripheral electrodes on the left side and the right side of the intermediate electrode form touch electrodes in a horizontal sliding direction of the touch sensing surface;

wherein the four peripheral electrodes have the same shape, the intermediate electrode is in a shape of a quadrangle with four inwardly curved arc-edges, and each of the four peripheral electrodes is in a shape of an arch with an arc-edge facing towards the intermediate electrode; and wherein the touch electrodes of the touch component are electrically connected to the touch chip respectively.

7. A touch-control method, applied to a wearable device, wherein the wearable device comprises a touch chip and a touch component, the touch component comprises M self-capacitive touch electrodes disposed on a single pattern wiring layer, wherein each of the touch electrodes is electrically connected to the touch chip respectively by a wire on the pattern wiring layer, and M is a positive integer greater than 2 and less than 10;

wherein the M touch electrodes form a touch sensing surface of the touch component, the touch sensing surface has a plurality of sliding detection directions, at least two of the plurality of sliding detection directions intersect and each associated with a respective touch function, a quantity of touch electrodes in each of the sliding detection directions is greater than 1, and the touch electrodes are arranged in an electrode pattern having a shape of a square;

wherein M equals 5, one of the touch electrodes is an intermediate electrode located at a center of the touch sensing surface, and other four of the touch electrodes are four peripheral electrodes located respectively on an upper side, a lower side, a left side and a right side of the intermediate electrode; the intermediate electrode and two of the four peripheral electrodes on the upper side and the lower side of the intermediate electrode form touch electrodes in a vertical sliding direction of the touch sensing surface, the intermediate electrode and two of the four peripheral electrodes on the left side and the right side of the intermediate electrode form touch electrodes in a horizontal sliding direction of the touch sensing surface;

wherein the four peripheral electrodes have the same shape, the intermediate electrode is in a shape of a quadrangle with four inwardly curved arc-edges, and each of the four peripheral electrodes is in a shape of an arch with an arc-edge facing towards the intermediate electrode; and wherein the touch-control method comprises:

acquiring, by the touch component, a plurality of frames of touch data of a touch operation;

obtaining touch position information of the touch operation by analyzing the plurality of frames of touch data, wherein the touch position information comprises at least one touch position, and a position of a touch electrode that has a largest self-capacitance variation value, which is greater than a preset touch threshold value, among the M touch electrodes that correspond to one frame of the touch data, is taken as one touch position of the touch operation; and determining a touch type of the touch operation according to the touch position information of the touch operation and a preset rule, wherein the touch type at least comprises a sliding operation in each of the sliding detection directions.

8. The touch-control method according to claim 7, wherein determining a touch type of the touch operation according to the touch position information of the touch operation and a preset rule comprises:
determining the touch type of the touch operation is a long press if the touch position of the touch operation is not changed and a touch duration of the touch operation is longer than a first preset touch duration.

9. The touch-control method according to claim 7, wherein determining a touch type of the touch operation according to the touch position information of the touch operation and a preset rule comprises:
determining the touch type of the touch operation is a click if the touch duration of the touch operation is shorter than a second preset touch duration.

10. The touch-control method according to claim 7, wherein the four peripheral electrodes are:
an upper electrode located on an upper side of the intermediate electrode;
a lower electrode located on a lower side of the intermediate electrode;
a left electrode located on a left side of the intermediate electrode; and
a right electrode located on a right side of the intermediate electrode; and
determining a touch type of the touch operation according to the touch position information of the touch operation and a preset rule comprises:
determining the touch type of the touch operation is sliding up or down, when the touch position of the touch operation satisfies one of the following preset sliding orders:
the touch position moves from the upper electrode to one or two neighboring ones of the left electrode, the intermediate electrode and the right electrode, and to the lower electrode; or
the touch position moves from the lower electrode to one or two neighboring ones of the left electrode, the intermediate electrode and the right electrode, and to the upper electrode; or
the touch position moves from the upper electrode to the intermediate electrode, and to the left electrode or the right electrode; or the touch position moves from the lower electrode to the intermediate electrode, and to the left electrode or the right electrode.

11. The touch-control method according to claim 7, wherein the four peripheral electrodes are:
an upper electrode located on an upper side of the intermediate electrode;
a lower electrode located on a lower side of the intermediate electrode;
a left electrode located on a left side of the intermediate electrode; and
a right electrode located on a right side of the intermediate electrode; and
determining a touch type of the touch operation according to the touch position information of the touch operation and a preset rule comprises:
determining the touch type of the touch operation is sliding left or right, when the touch position of the touch operation satisfies one of the following preset sliding orders:
the touch position moves from the left electrode to one or two neighboring ones of the upper electrode, the intermediate electrode and the lower electrode, and to the right electrode; or
the touch position moves from the right electrode to one or two neighboring ones of the upper electrode, the intermediate electrode and the lower electrode, and to the left electrode.

12. The touch-control method according to claim 7, wherein the four peripheral electrodes are:
an upper electrode located on an upper side of the intermediate electrode;
a lower electrode located on a lower side of the intermediate electrode;
a left electrode located on a left side of the intermediate electrode; and
a right electrode located on a right side of the intermediate electrode; and
determining a touch type of the touch operation according to the touch position information of the touch operation and a preset rule comprises:
determining the touch type of the touch operation is sliding around a circle, when the touch position of the touch operation satisfies the following preset sliding order:
the touch position moves from one of the peripheral electrodes around the intermediate electrode to other three peripheral electrodes around the intermediate electrode clockwise or counter-clockwise.

* * * * *